United States Patent
Inui et al.

(10) Patent No.: US 7,308,587 B2
(45) Date of Patent: Dec. 11, 2007

(54) METHOD AND APPARATUS FOR PREVENTING THE TRANSITIONING OF COMPUTER SYSTEM POWER MODES WHILE THE SYSTEM IS IN MOTION

(75) Inventors: Takashi Inui, Yokohama (JP); Seiichi Kawano, Sagamihara (JP); Masahiko Nomura, Sagamihara (JP); Shinji Matsushima, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/863,156

(22) Filed: Jun. 8, 2004

(65) Prior Publication Data

US 2005/0022039 A1 Jan. 27, 2005

(30) Foreign Application Priority Data

Jun. 12, 2003 (JP) .............................. 2003/168363

(51) Int. Cl.
*G06F 1/32* (2006.01)
*G06F 1/26* (2006.01)

(52) U.S. Cl. ...................... 713/310; 713/320; 702/141

(58) Field of Classification Search ................. 713/300
See application file for complete search history.

(56) References Cited

FOREIGN PATENT DOCUMENTS

| JP | 2001057011 A | * | 2/2001 |
| JP | PUPA2001057011 | | 2/2001 |
| JP | PUPA2001184772 | | 7/2001 |

* cited by examiner

*Primary Examiner*—James K. Trujillo
*Assistant Examiner*—Anand B. Patel
(74) *Attorney, Agent, or Firm*—Duke W. Yee; Mark E. McBurney; Gerald H. Glanzman

(57) ABSTRACT

A computer apparatus provides control for automatically switching the apparatus between various operating modes requiring varying levels of power consumption. An embedded controller determines whether or not the computer apparatus is in motion (vibration, acceleration, rotation, etc.) on the basis of acceleration information obtained through an accelerometer provided in the computer apparatus. If the computer apparatus is in motion, the embedded controller provides control so as to prevent switching between system operating modes in order to protect certain components of the apparatus from damage which might be caused by switching operating modes while in motion.

3 Claims, 7 Drawing Sheets

METHOD AND APPARATUS FOR PREVENTING THE TRANSITIONING OF COMPUTER SYSTEM POWER MODES WHILE THE SYSTEM IS IN MOTION

BACKGROUND OF THE INVENTION

1. Field of the Invention

The present invention relates to the control of power modes for computer systems, and more particularly to control for switching between operating modes to protect various devices such as a hard disk drive.

2. Background

One of power saving schemes for a personal computer is switching it between operating states (hereinafter referred to as system operating modes). That is, when the personal computer is not used for a certain amount of time, the unnecessary operation of peripheral devices or internal components that are not employed is suspended to shut off their power needs and thus reduce the power consumption of the system. Such system operating modes typically include modes referred to as standby (suspend) mode and hibernation mode.

FIG. 7 is a schematic diagram of the hardware configuration of a typical personal computer. In FIG. 7, a CPU 701 performs various arithmetical and other operations under the control of a program such as an operating system (not shown). A main memory 702 is an internal storage from or into which data is directly read or written by the CPU 701, and which stores programs for controlling the CPU 701 or data for arithmetical operation. Generally, the main memory 702 is a volatile memory such as DRAM. An HDD 703 is a hard disk unit (Hard Disk Drive) employed as an external storage unit. A monitor 704 is an output unit for displaying the processed results by the CPU 701, and connected to the CPU 701 via a graphics display mechanism having a video memory (not shown). The monitor 704 may be a CRT display or an LCD (Liquid Crystal Display), for example. The personal computer system may include, or be connected to, various other peripheral devices according to the needs and desires of a user (not shown).

Among the system operating modes for power saving, in the standby mode, the power of the HDD 703 and monitor 704 is shut off, and other peripheral devices are placed in a least power consumption operation. However, in order to maintain the data residing in the main memory 702, it is necessary to continue to supply power to the main memory 702.

In contrast, in the hibernation mode, all the information including the contents of the main memory 702 and the contexts of various peripheral devices are written into the HDD 703 and all unnecessary power is shut off. Accordingly, no power is supplied to the main memory 702 while the system is in the hibernation mode. But, even when the power of the system is fully shut off, the system can be restored to its previous state by reading the saved data from the HDD 703 when the system power is next turned on.

In transitioning from any system operating mode to the hibernation mode, it is necessary to write a large amount of data into the HDD 703 in a certain time (20 seconds or more). On the other hand, it takes a much shorter time (usually 5 seconds or less) to transition to the standby mode, which is much simpler due to the lessened need for data transfer. Therefore, it is typical that when the system is not used for a short amount of time, the system transitions to the standby mode, and only when a certain amount of time has passed in the standby mode will the system automatically transition to the hibernation mode. For example, in the Windows® XP operating system from Microsoft Corporation, USA, power management is enabled on the basis of the ACPI (Advanced Configuration and Power Interface). For example, if a "max battery" power scheme is selected in the power options in the control panel, the control is provided such that the system enters the "standby mode" if the system is not employed for two minutes and the system only transitions to the hibernation mode after one hour of non-use. Other settings may be available in this and other operating systems which specify differing timeframes for the transition to each of these and other operating modes which may be available. Systems and operating systems may also be available which offer different or additional operating modes providing for other, varying degrees of power savings.

In controlling a system to transition to the hibernation mode after the elapse of a certain time in the standby mode, the system automatically starts the operation to write data into the HDD when the specified time has passed.

However, in a portable computer such as a notebook personal computer or PDA (Personal Digital Assistant), it sometimes occurs that the computer apparatus is in violent movement such as vibration, acceleration or rotation. If the operation of transitioning to the hybernation mode is started at this time, there is the possibility that the HDD may be damaged, along with other peripherals or components subject to damage if operated while moving. In this case, the worst-case scenario is that the HDD is disabled and the data in the HDD lost.

In particular, it is noted that a user typically takes care not to apply a severe vibration or shock to a computer apparatus under normal use, but a user may treat a computer in the standby mode as if it were in a power OFF state. Therefore, while in standby mode, there is a heightened possibility that the user may be relatively careless in handling the computer apparatus, increasing the chance of damage to the HDD upon transitioning to the hibernation mode.

To avoid some of the above problems and disadvantages, the system may be prepared for hibernation mode when transitioning to the standby mode (see U.S. Pat. No. 5,551,043, for example). That is, in the standby mode, the memory contents are written into the HDD, making the system ready for transitioning to the hibernation mode at any time. And if the conditions such as the elapse of a fixed time and a voltage drop of the battery are met, the power is shut off and the system enters the hibernation mode.

However, using this method, transitioning to the standby mode takes just as much time as entering the hibernation mode, resulting in lower availability of the system.

The same disadvantages may occur when the HDD is automatically accessed, such as when the system not only transitions to the hibernation mode, but also returns from the standby mode or hibernation mode under timer control.

Thus, in the light of the above-mentioned problems, it is an object of the present invention to protect components of a computer apparatus against a physical shock by controlling switching between system operating modes on the basis of the presence or absence of the physical motion of the computer apparatus such as vibration, acceleration and rotation.

SUMMARY OF THE INVENTION

In order to achieve the above object, an embodiment of the present invention is implemented as a computer apparatus that allows switching between a plurality of system operating modes yielding different power consumptions. This computer apparatus comprises apparatus condition determining means for determining the physical conditions under which the computer apparatus is placed, and system operating mode control means for controlling switching between the system operating modes. The system operating mode control means provides control so as to prevent switching between the system operating modes and retains the system in the current operating mode if the apparatus condition determining means determines that the apparatus is experiencing a problematic level of movement (such as vibration, acceleration or rotation) when the system operating mode control means attempts to switch from one system operating mode to another.

Herein, the system operating mode control means may provide control under which the current operating mode is retained, only if switching from one system operating mode to another involves access to a hard disk drive contained in the computer apparatus. Also, the system operating mode control means may perform switching between the system operation modes on the basis of the status of ACPI or other power management criteria selection means.

Also, in order to achieve another object, another embodiment of the present invention is implemented as a computer apparatus having at least one peripheral device mounted thereto. This computer apparatus comprises a first control circuit for controlling a power supply to the peripheral device, a second control circuit for controlling the control operation of the first control circuit while monitoring the condition of the computer apparatus, and an accelerometer installed in the computer apparatus. The second control circuit determines the condition of the computer apparatus on the basis of the acceleration information sensed by the accelerometer and causes the first control circuit to suspend the power supply to the peripheral device in an inactive state. The second control circuit may determine the condition of the computer apparatus in consideration of a history of the information on acceleration sensed by the accelerometer.

In order to achieve a further object, a further embodiment of the present invention includes a computer apparatus that allows switching between a plurality of system operating modes yielding different power consumptions. This computer apparatus comprises a hard disk drive, a control circuit for controlling power supply to the hard disk drive according to the operating mode of the system, and an accelerometer provided in the computer apparatus. The control circuit provides the control of the power supply to the hard disk drive in consideration of acceleration information sensed by the accelerometer, the control being associated with switching between the operating modes.

A further embodiment of the present invention is a switching control method for controlling switching between a plurality of system operating modes in a computer apparatus that allows switching between the plurality of system operating modes yielding different power consumptions. This switching control method comprises the steps of determining whether or not the computer apparatus is in motion, and preventing switching between the system operating modes if it is determined that the computer apparatus is in motion when attempting to switch from one system operating mode to another.

Still further, embodiments of the present invention include a power supply control method for controlling a power supply to a peripheral device in a computer apparatus having the peripheral device mounted thereto. This power supply control method comprises a step of determining the condition of the computer apparatus on the basis of acceleration information sensed by an accelerometer, and a step of controlling the power supply to the peripheral device according to an operating mode of the system, and suspending the initiation of power supply to the peripheral device associated with the switching from one system operating mode to another, if it is determined that the computer apparatus is in motion.

Another embodiment of the present invention appears as a program for controlling a computer with respect to switching between a plurality of system operating modes, each mode providing for a different level of power consumption. This program may be stored and distributed in a magnetic disk, an optical disk, a semiconductor memory or other recording media, or distributed via a network.

The present invention will be described below with respect to certain preferred embodiments thereof. However, the following description of these embodiments is not intended to limit the present invention, the scope of which is defined by the claims appended hereto. Not all combinations of the features described in these embodiments are essential to a solution according to the present invention.

BRIEF DESCRIPTION OF THE DRAWINGS

Embodiments of the present invention will be described in some detail in the following specification and with reference to the following figures in which like elements are referred to using like reference numbers and in which.

DETAILED DESCRIPTION OF EMBODIMENTS
OF THE PRESENT INVENTION

Hereinafter, the present invention will be explained by way of description of exemplary embodiments, however, these embodiments should not be read as limiting the invention's scope which shall be delineated solely by the claims appended hereto. In addition, all combinations of characteristics explained in these embodiments are not necessary for each implementation of the invention.

Figure 1:
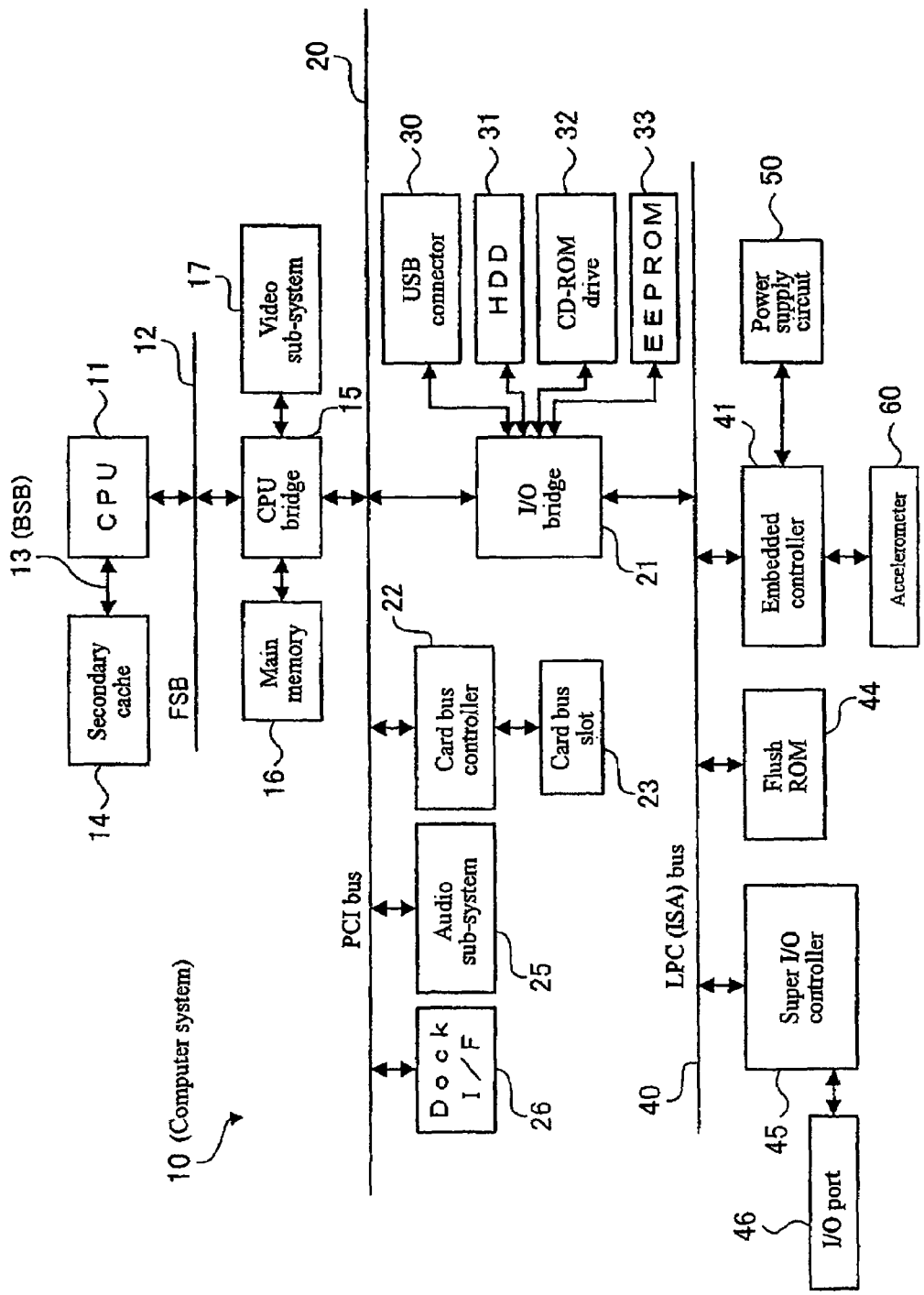
FIG. 1 is a block diagram showing a hardware configuration of a computer system in accordance with one embodiment of the present invention.

In the computer system 10 as shown in FIG. 1, a CPU 11 performs various operations and controls the overall computer system 10. The CPU 11 is interconnected to various components via the buses at three stages including an FSB (Front Side Bus) 12 as a system bus, a PCI (Peripheral Component Interconnect) bus 20 as a high speed I/O device bus, and an ISA (Industry Standard Architecture) bus 40 as a low speed I/O device bus. This CPU 11 employs a cache memory for storing a part of the contents of a main memory in, for example, an SRAM, whereby the fast processing is implemented by storing the program code or data in the cache memory. Typically, an SRAM of about 128 Kbytes as a primary cache is accumulated inside the CPU 11, but a secondary cache 14 that is an external cache of about 512K to 2 Mbytes is provided via a BSB (Back Side Bus) 13 as a dedicated bus to supplement an insufficient storage capacity. It may be possible to omit the BSB 13, and connect the secondary cache 14 to the FSB 12 to avoid a package with many terminals, thereby reducing the cost.

The FSB 12 and the PCI bus 20 are communicated via a CPU bridge (host-PCI bridge) 15 called a memory/PCI chip. This CPU bridge 15 has a memory controller function of controlling the access operations to the main memory 16, and a data buffer for absorbing a difference in the data transfer rate between the FSB 12 and the PCI bus 20. The main memory 16 is a writable memory for use as a read area for reading the execution programs of the CPU 11, or a working area for writing the processing data of the execution programs. The main memory 16 may be composed of a plurality of DRAM chips, for example. The execution programs include an OS, various sorts of drivers for operating the hardware of peripheral devices, and application programs for performing the specific operations.

A video sub-system 17 implements the functions associated with the image display and comprises a video controller. This video controller processes a drawing instruction from the CPU 11 to write the processed drawing instruction into a video memory, as well as reading the drawing information from the video memory to output the drawing data to a monitor such as a liquid crystal display (LCD) or other type of display unit.

The PCI bus 20 is capable of transferring data at relatively high rates. An I/O bridge (south bridge or I/O hub) 21, a card bus controller 22, an audio sub-system 25, and a docking station interface (Dock I/F) 26 are connected to this PCI bus 20.

The I/O bridge 21, which is a control circuit having a bridge function between the PCI bus 20 and an ISA bus 40, has a DMA controller function, a programmable interrupt controller (PIC) function, a programmable interval timer (PIT) function, an IDE (Integrated Device Electronics) interface function, a USB (Universal Serial Bus) function, and an SMB (system Management Bus) interface function, and contains a real time clock (RTC). Also, it manages the power supply (power management) to each device in the computer system 10.

The DMA controller function involves transferring data between the peripheral device(s) (e.g., FDD (Floppy® Disk Drive)) and the main memory 16 without interposition of the CPU 11. The PIC function involves executing a predetermined program (interrupt handler) in response to an interrupt request (IRQ) from the peripheral device. The PIT function involves generating a timer signal at a predetermined period, the generation period being programmable. Also, an interface implemented by the IDE interface function has an IDE hard disk drive (HDD) 31 connected, and a CD-ROM drive 32 connected in ATAPI (AT Attachment Packet Interface). Instead of the CD-ROM drive 32, other types of IDE devices such as a DVD (Digital Versatile Disc) drive may be connected. The external storage device such as the HDD 31 or CD-ROM drive 32 is accommodated in an accommodation place called a "media bay" or "device bay" within the computer apparatus of the computer system 10.

Also, the I/O bridge 21 is provided with a USB port for connection with a USB connector 30. Moreover, the I/O bridge 21 has an EEPROM 33 connected via an SM bus. This EEPROM 33 is a memory for holding a BIOS (Basic Input/Output System), a program for controlling an embedded controller 41, and the information such as a password registered by the user, a supervisor password, and a product serial number, and has non-volatile and electrically rewritable stored contents.

The card bus controller 22 is a dedicated controller for directly connecting a bus signal of the PCI bus 20 to an interface connector (card bus) in the card bus slot 23, in which a PC card is mounted in the card bus slot 23. The docking station interface 26 is a hardware for connection of a docking station (not shown) that is a function extension unit when the computer system 10 is a notebook personal computer.

The ISA bus 40 has a lower data transfer rate than the PCI bus 20. The ISA bus 40 is connected to the embedded controller 41, a flash ROM 44, and a Super I/O controller 45. Moreover, the ISA bus 40 is also employed to connect peripheral devices operating at relatively low speeds such as a keyboard/mouse controller. This Super I/O controller 45 is connected to the I/O port 46 and controls the driving of the FDD, the parallel data input/output (PIO) via a parallel port, and the serial data input/output (SIO) via a serial port.

The embedded controller 41 is a control circuit for controlling a keyboard, not shown, and connected to a power supply circuit 50 to take charge of a part of the power management function together with a gate array logic under the control of a built-in power management controller (PMC: Power Management Controller). Also, in this embodiment, the embedded controller determines whether or not the computer apparatus of the computer system 10 is in motion (vibration, movement, or rotation) on the basis of the acceleration information sent from an accelerometer 60, and controls power supply to the components.

By the way, among the components, the HDD 31 has a mechanically operating structure and is especially susceptible to problems caused by physical conditions such as vibration, rotation or other motion. These problems can cause a malfunction in reading or writing data. Also, if a magnetic head for reading or writing data comes into contact with the magnetic disk being read or written, the data recording surface may become damaged to the point of disabling the ability to read or write data.

When the computer system 10 operates in the normal operating mode, it is assumed that a user takes care not to apply a large vibration or shock to the computer system 10 (hereinafter sometimes referred to as the computer apparatus or the system). However, when the system is in a standby mode or a hibernation mode, a user may deal with the system as if it were in a normal power OFF state. As such, the user may be unmindful that the computer apparatus is in vibration or other motion. Therefore, when an operation control is performed in transitioning from the standby mode to the hibernation mode, or automatically returning from the hibernation mode to the normal operating mode, there is a fear that the HDD 31 may be damaged by receiving a large vibration or shock during the transition.

In this embodiment, the embedded controller 41 determines whether the computer apparatus is in motion by processing the acceleration information acquired from the accelerometer 60. That is, if the acceleration information varies during a predetermined period of time, it is found that the computer apparatus is in motion. And when the computer apparatus is in motion, the embedded controller suspends or delays the transitioning of the system from one operating mode to another, considering that the system could experience a damaging physical shock.

The transition of the system operating mode in the computer system 10 is performed by the I/O bridge 21. Accordingly, the embedded controller 41 controls the I/O bridge 21 to suspend the transitioning from one system operating mode to another. Herein, the embedded controller 41 is a one-chip microcomputer for monitoring and controlling various devices (peripheral devices or sensors, power supply circuit 50), irrespective of the system operating mode of the computer system 10.

Figure 2:
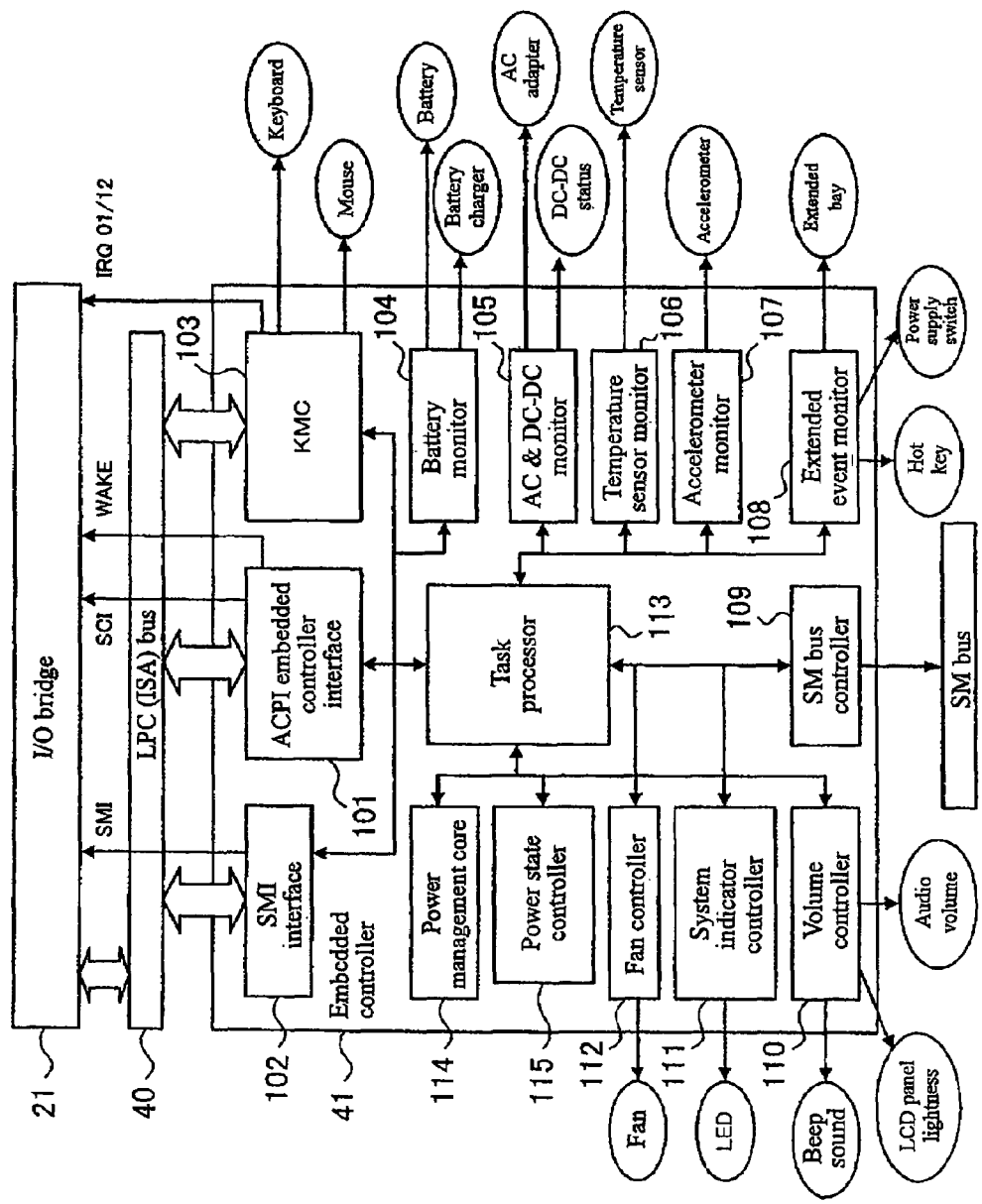
FIG. 2 is a functional configuration diagram of an embedded controller for performing the mode management and operation control of a computer according to embodiments of the present invention.

The embedded controller 41 as shown in FIG. 2 comprises a battery monitor 104 and an AC & DC-DC monitor 105 having an ACPI embedded controller interface 101 for connecting to the ISA bus 40, an SMI (System Management Interrupt) interface 102, and a KMC (Keyboard/Mouse Controller) 103 for sending an input signal to the CPU 11 by controlling an input device such as keyboard or mouse, and monitoring the power state (whether or not the system is driven by battery and the battery voltage), a temperature sensor monitor 106 for monitoring the temperature of a battery, an accelerometer monitor 107 for monitoring the accelerometer 60 to acquire the information on acceleration, and an extended event monitor 108 for monitoring the operation of a power button or a hot key associated with a predetermined function and the mounting of device on the extension bay such as media bay or device bay. Also, the embedded controller 41 comprises an SM bus controller 109 for connecting to the EEPROM 33 via the SM bus, a volume controller 110 for controlling the audio volume or the brightness of a display unit, a system indicator controller 111 for controlling the beep sound and the lighting of an LED provided in the computer apparatus, a fan controller 112 for controlling the operation of a cooling fan for the CPU 11 or the power supply circuit 50, a task processing part 113 for performing the processings required for various functions, a power management core 114 for making the power management of the embedded controller 41 itself, and a power state controller 115.

These functions in the embedded controller 41 are implemented under the control of a control program of the embedded controller 41 stored in the EEPROM 33. Since the stored contents of the EEPROM 33 are electrically rewritable, a function of controlling switching between system operating modes in this embodiment may be added to the existent embedded controller 41.

Figure 3:
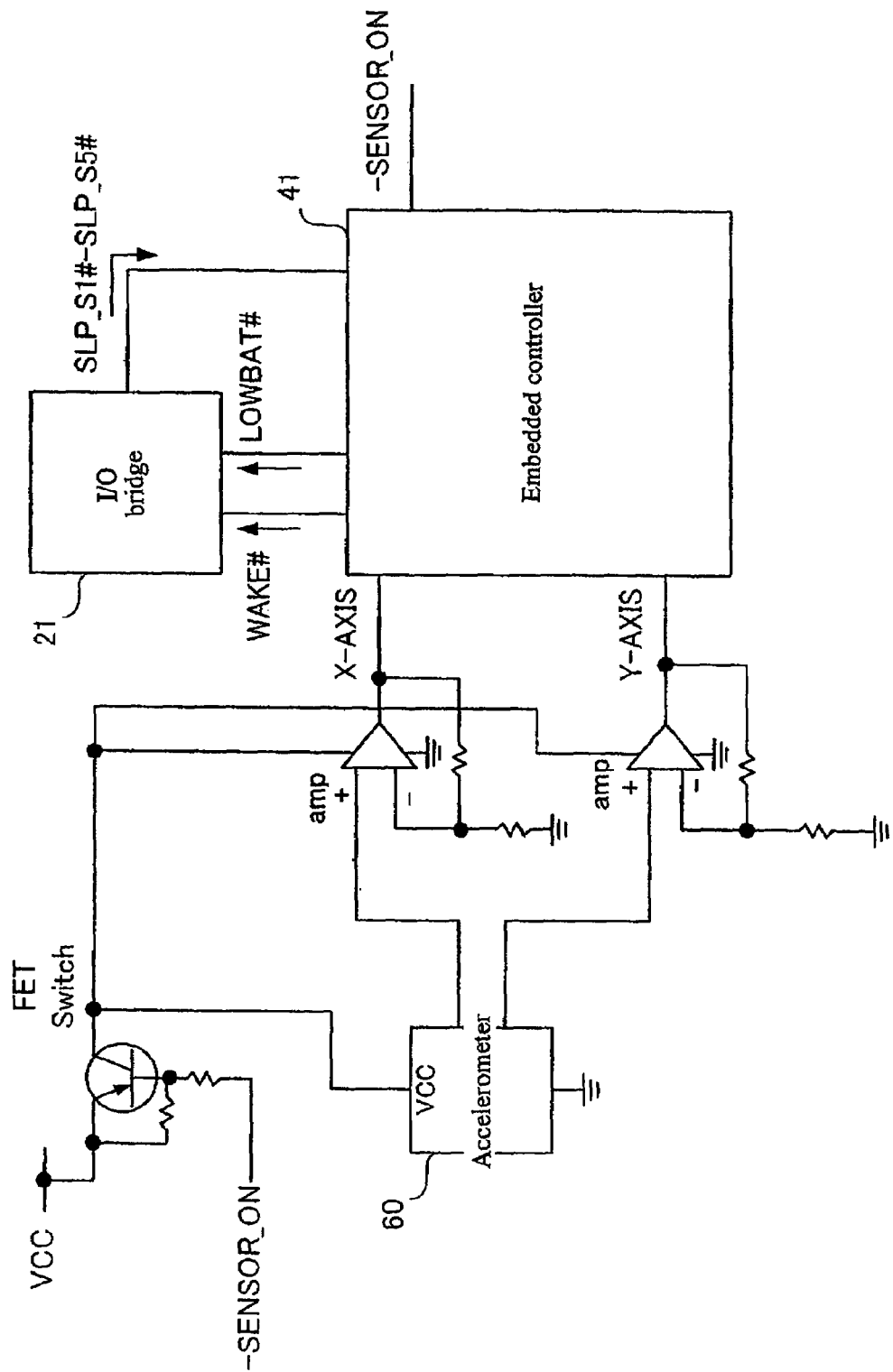
FIG. 3 is a diagram showing the relationship between the embedded controller, an I/O bridge and an accelerometer according embodiments of the present invention.

As shown in FIG. 3, the accelerometer 60 is installed within an apparatus housing of the computer system 10, operates via an FET switch by receiving a power supplied from a VCC power source to measure an acceleration occurring in the apparatus housing, and output a signal of measured value. The output signal is amplified via an amplifier, and input as the acceleration information into the embedded controller 41. In an illustrated example, the information on acceleration in orthogonal bi-axial direction of X direction (X-AXIS) and Y direction (Y-AXIS) is input into the embedded controller 41. Alternatively, information on acceleration in tri-axial directions may be input.

The embedded controller 41 aquires the information (e.g., status (S0 to S5) in ACPI) indicating the current system operating mode of the computer system 10 from the I/O bridge 21, and recognizes the current system operating mode. Also, the embedded controller 41 determines which mode the system operating mode of the computer system 10 transits to by analyzing the information on acceleration from the accelerometer 60. The embedded controller 41 issues a "LOWBAT#" signal for transitioning to or retaining the standby mode or hibernation mode for saving power of the computer system 10 and a "WAKE#" signal for returning to the normal operating mode and sends it to the I/O bridge 21.

The I/O bridge 21 controls the power supplied to each component of the computer system 10 on the basis of the "LOWBAT#" or "WAKE#" signal input from the embedded controller 41 and controls the switching between system operating modes.

That is, in this embodiment, the accelerometer 60 and the embedded controller 41 function as apparatus condition determining means for determining the physical conditions under which the computer apparatus is operating, and the embedded controller 41 and the I/O bridge 21 function as system operating mode control means for controlling switching between system operating modes.

Figure 4:
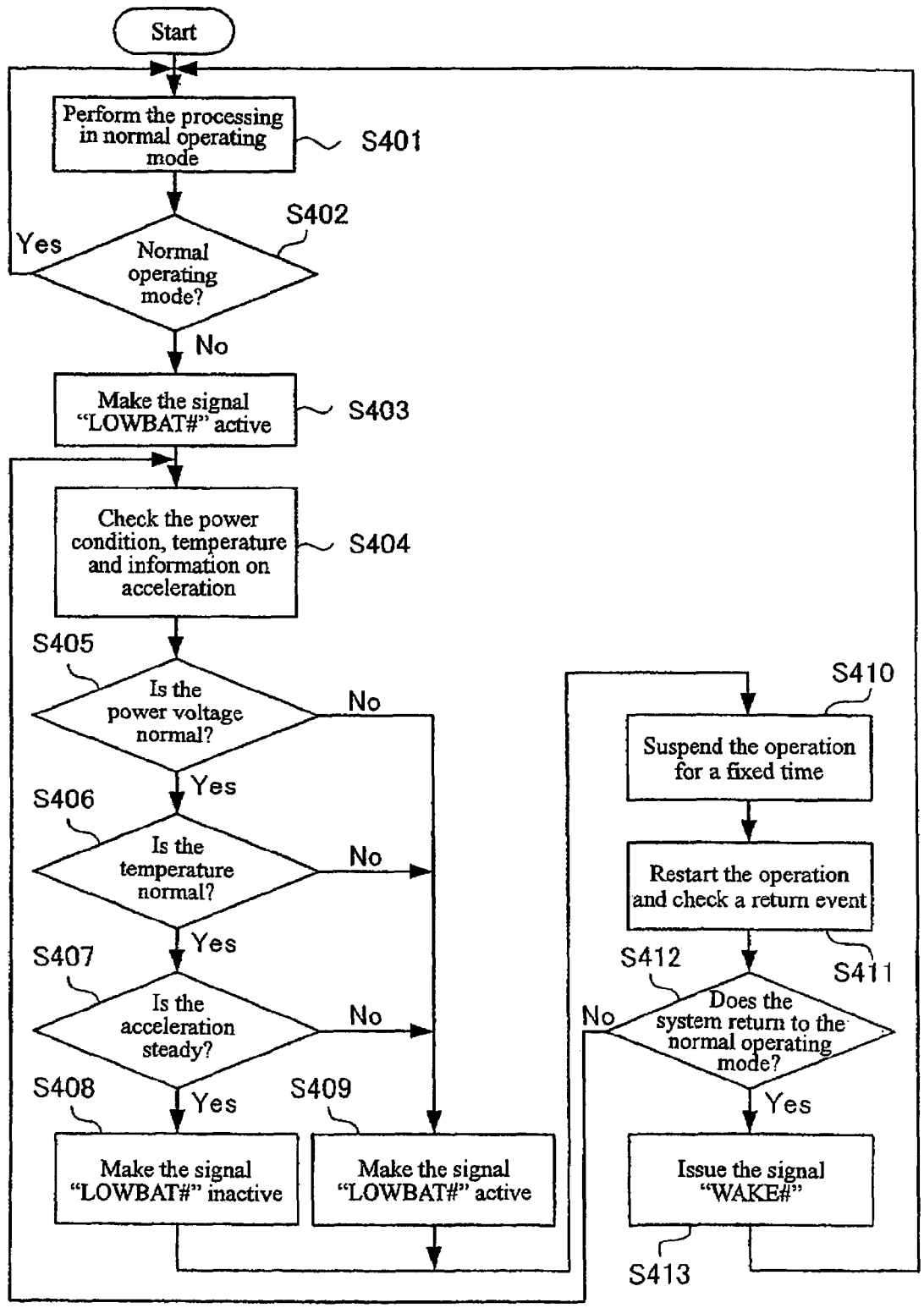
FIG. 4 is a flowchart of the operation of the embedded controller in controlling switching between system operating modes according to this embodiment.

Referring to FIG. 4, the embedded controller 41 performs the processing in the current system operating mode, when the computer system 10 operates in the normal operating mode, and acquires the information indicating the current system operating mode of the computer system 10 to be sent from the I/O bridge 21 to the embedded controller 41 to monitor the system operating mode (steps 401, 402).

When the system operating mode transitions from the normal operating mode to the power saving mode (standby mode or hibernation mode), the information sent from the I/O bridge 21 is first changed. Herein, it is assumed that the status in ACPI is changed from the normal operating mode S0 to the standby mode S3. Then, the embedded controller 41 makes the signal "LOWBAT#" active (step 403).

The embedded controller 41 makes necessary control by monitoring the inputs from keyboard or mouse, power condition, battery temperature, and acceleration information, even when the computer system 10 is in the standby mode without power supply to the main components. In this case, the embedded controller 41 operates at a regular interval (e.g., 250 milliseconds) to examine various kinds of input information, and determine whether or not the system operating mode should be switched (i.e., returns to the normal operating mode).

In this embodiment, the power condition, battery temperature and acceleration information are checked as the conditions for determining whether or not the system returns to the normal operating mode (step 404).

First of all, when the computer is driven by battery in the power condition, a check is made for a drop in the power voltage (step 405). Then, a check is made for a rise in the battery temperature, causing a degradation in the battery performance (step 406). A check is also made for any variation in the acceleration information output from the accelerometer 60 (step 407). The check for the information on acceleration will be described later. These checks may not be necessarily performed in the above order. In addition to the above checks, more check items for altering the system operating mode may be appropriately added.

At steps 405 to 407, if the results of all the check items are appropriate (the system operating mode returns to the normal operating mode without problem), the signal "LOWBAT#" is made inactive (step 408). Thereby, the system operating mode is permitted to return to the normal operating mode, and the conditions for returning to the normal operating mode by timer control or hot key input are satisfied to give rise to a return event and enable the return.

On the other hand, when at least one of the check items at step 405 to 407 is false (it is not permitted or preferable to return the system operating mode to the normal operating mode), the signal "LOWBAT#" is kept active (step 409).

Thereby, even if a return event to the normal operating mode occurs, the system is kept in the standby mode.

After the above processings, the embedded controller 41 suspends its operations for a fixed period of time (step 410). This period of time can be arbitrarily set, for example, at 250 milliseconds. After the elapse of the set-up time, the operation is restarted, and a check is made to see if an event indicating a return to the normal operating mode has occurred (i.e., the set-up time has passed in the timer control, or any input of the hot key is made (step 411). Then, it is determined whether the system should be allowed to return to the normal operating mode (step 412). When the signal "LOWBAT#" is active at step 409, even though an event indicating a return to the normal operating mode has occurred as described above, the system does not return to the normal operating mode and is kept in the standby mode.

If it is determined that the system should be allowed to return to the normal operating mode at step 412, the embedded controller 41 issues and sends the signal "WAKE#" to the I/O bridge 21 (step 413). Then, the procedure returns to step 401 to perform the processing in the normal operating mode. On the other hand, if it is determined that the system should not return to the normal operating mode, the embedded controller 41 checks each item at step 404 as discussed above, whereby the signal "LOWBAT#" is made active or inactive, as appropriate, and the operation is suspended for a fixed period of time.

Figure 5:
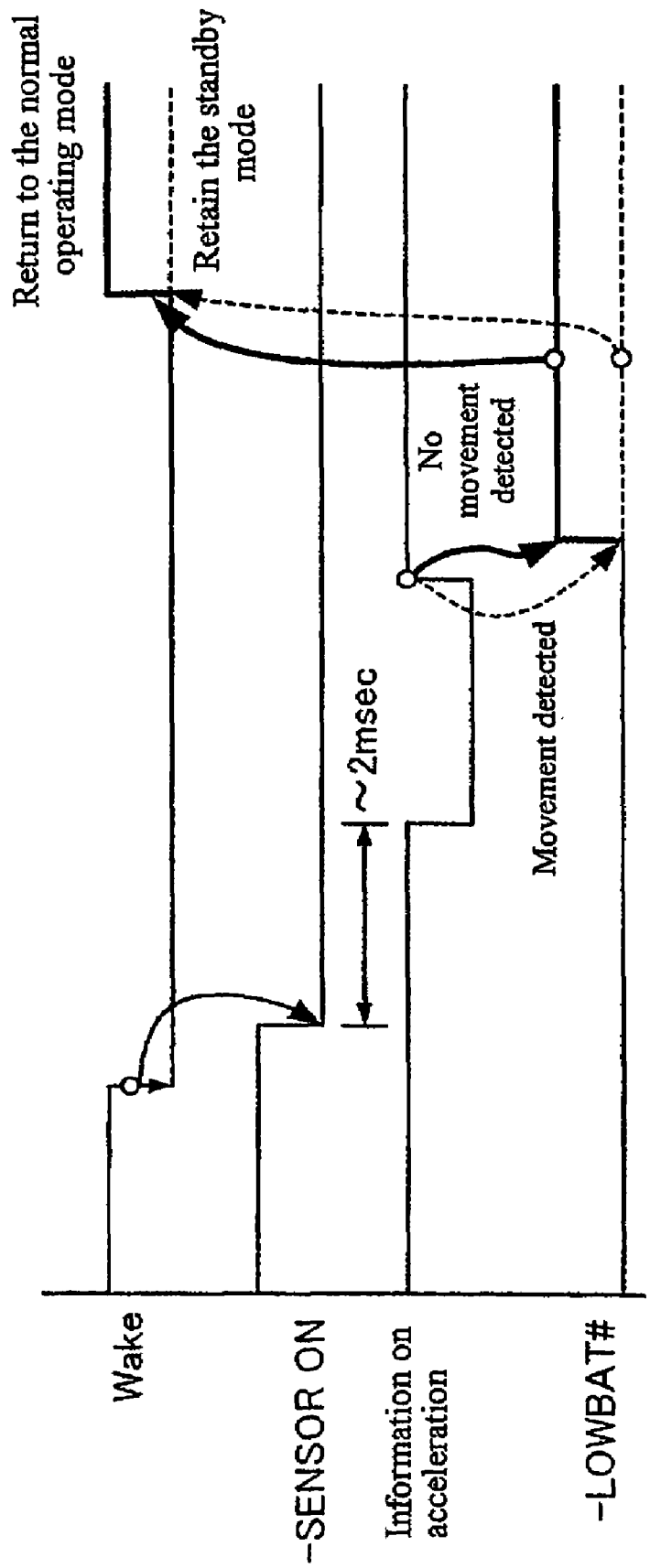
FIG. 5 is a timing chart showing the operation of the embedded controller on the basis of information on acceleration acquired from the accelerometer according to this embodiment.

As described above, the embedded controller 41 is awakened at regular intervals, irrespective of the system's current operating mode, and receives the acceleration information from the accelerometer 60 to make an evaluation of the system's status and set the signal "LOWBAT#" appropriately. The embedded controller 41 starts the operation in accordance with a predetermined external signal (EC Wake), and examines the situation of hardware such as button or bay, and the power condition (voltage, temperature). And the signal "SENSOR ON" for activating the accelerometer 60 is controlled (in the example shown, low level) to make the accelerometer 60 operable, as shown in FIG. 5.

The embedded controller 41 waits for the accelerometer 60 to be stable in operation (about 2 milliseconds), collects and evaluates the acceleration information from the accelerometer 60 (Sensor Read), and saves data in an internal memory. At this time, if it is determined that the computer system is in motion based on the acquired acceleration information, the embedded controller 41 retains the signal "LOWBAT#" active (at low level in the illustrated example). Thereby, even if a return event occurs when the return conditions to the normal operating mode are satisfied, the system operating mode is prevented from returning to the normal operating mode.

On the other hand, if it is determined that the computer system is not in motion, the embedded controller 41 makes reference to the history of information on acceleration for a certain period of time in the past that is saved in the internal memory. Herein, by making reference to the history of information on acceleration, it can be determined whether the rest state should continue for a fixed period of time or more. The acceleration history will indicate if, for instance, the computer apparatus is continually in motion or is typically in motion only a short time after the last determination that the computer apparatus is in motion. How much history of accleration information should be referenced, or how long the acceleration information should remain constant in order to decide that the computer apparatus is in the rest state (threshold value), may be set arbitrarily.

Figure 6:
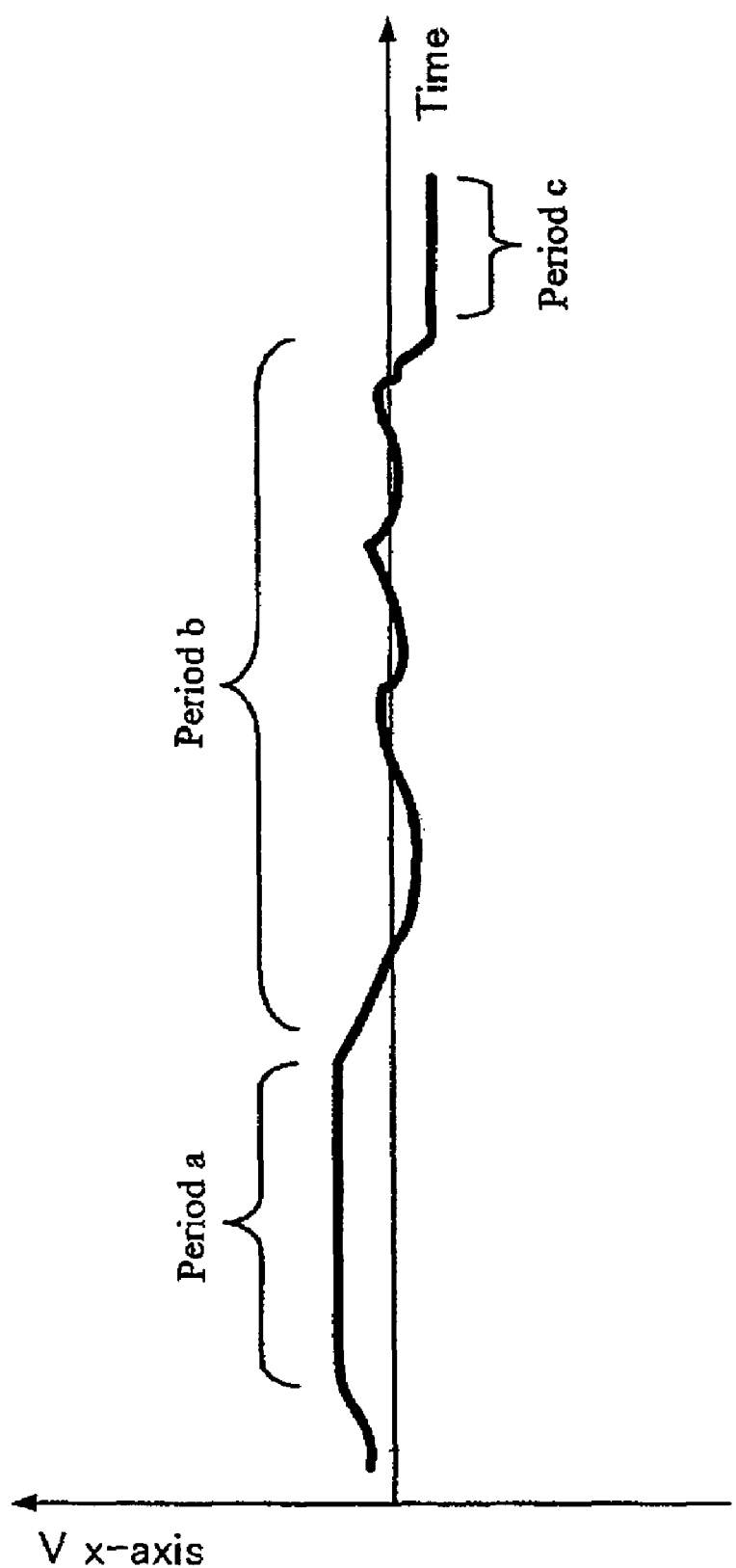
FIG. 6 is a graph showing an example of the history of information on acceleration for use in this embodiment.
Figure 7:
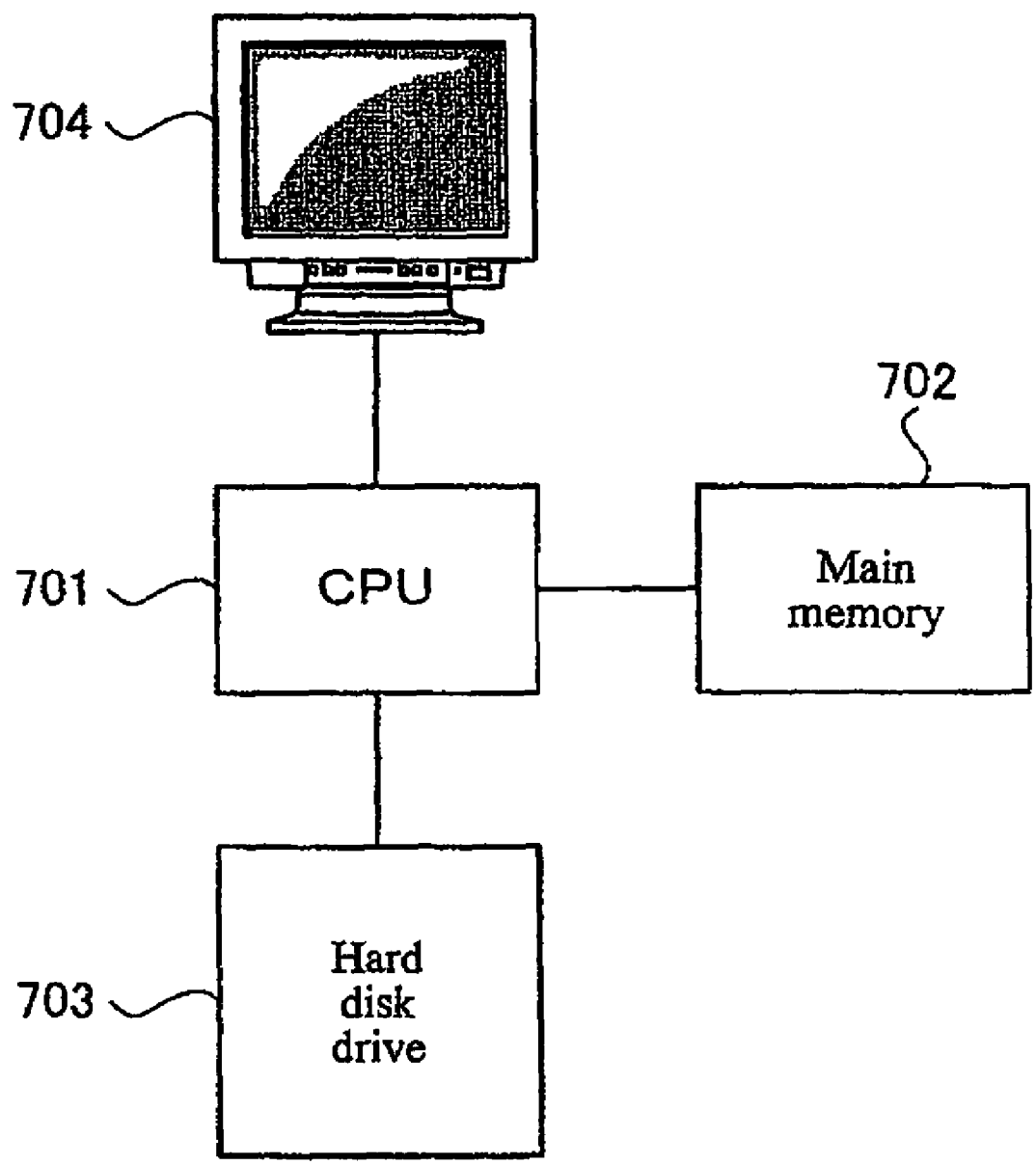
FIG. 7 is a schematic diagram of a hardware configuration of a typical personal computer.

FIG. 6 is a graph showing an example of the history of information on acceleration. For simplicity, the history of information on acceleration in one direction (x direction) is only illustrated in FIG. 6, but the information on acceleration in the Y direction or Z direction may be actually added and evaluated.

In FIG. 6, in period a, the acceleration value is constant for a certain length of time, whereby it is evaluated that the computer apparatus is in no violent movement such as vibration. Note that, for the sake of simplicity, FIG. 6 illustrates the history of acceleration information in one direction (x-direction) only. Acceleration information and the related histories may also be stored and checked for the other directions.

In period b, however, the acceleration value is continuously varying, whereby it is evaluated that the computer apparatus is in violent motion. In this case, it is not preferable that a peripheral device such as HDD 31 is initiated by switching the system operating mode. Also, in period c, the acceleration value is constant, but only a short time has passed since the end of period b during which the acceleration value is varied, with a possibility that the computer apparatus is continually in motion in period b, whereby it is not preferable that the peripheral device such as HDD 31 is initiated by switching the system operating mode.

If there is no trace (variation in the acceleration) in which the computer apparatus is in motion for a certain period of time, the embedded controller 41 makes the signal "LOWBAT#" inactive (at high level in the illustrated example) to permit the system operating mode to return to the normal operating mode (as indicated by the bold line in FIG. 5).

On the other hand, within a fixed period or time or more since the acceleration variation is last recorded, the embedded controller 41 retains the signal "LOWBAT#" active (at low level in the illustrated example) (as indicated by the broken line in FIG. 5). Thereby, it is possible to prevent the system operating mode from returning to the normal operating mode even though an event indicating a return to the normal operating mode occurs.

After the above operation, the embedded controller 41 is suspended and restarted after a fixed period of time (250 milliseconds, for example). Herein, it is assumed that an event indicating a return to the normal operatin mode occurs during this suspension. In this case, after the restart, the embedded controller 41 checks the situation of hardware such as button or bay, and the power condition (voltage, temperature) to detect the occurrence of an event indicating a return to the normal operating mode. Then, the embedded controller 41 checks the signal "LOWBAT#", and retains the current system operating mode (disabling or delaying the return of the system to the normal operating mode) if the signal "LOWBAT#" is active (as indicated by the broken line in FIG. 5). On the other hand, if the signal "LOWBAT#" is inactive (as indicated by the bold line in FIG. 5), the embedded controller 41 issues and sends the signal "WAKE#" to the I/O bridge 21. Thereby, the system transitions from the standby mode to the normal operating mode.

In the above example in which the system operating mode of the computer system 10 returns from the standby mode to the normal operating mode, the operation of the embedded controller 41, the accelerometer 60 and the I/O bridge 21 has been described. However, in this embodiment, switching between system operating modes is suspended until the computer apparatus is stationary in order to protect the HDD 31. This embodiment is broadly applicable when access to the HDD 31 is required when switching between system operating modes. That is, in controlling the system to automatically transition to the rest mode after the elapse of a fixed time in the standby mode, it is required to write data held in the main memory 16 into the HDD 31 to transition to the rest mode. Thus, in this embodiment, the standby mode is retained in the condition where the computer apparatus is in motion without switching between system operating modes. On the other hand, when no access to the HDD 31 is required, such as when transitioning from the normal operating mode to the standby mode, it is possible to switch between system operating modes without considering the acceleration information from the accelerometer 60.

Also, in this embodiment, power supply to the peripheral devices including the HDD 31, but not the access to the HDD 31, is controlled in switching between system operating modes, whereby it is possible to protect the peripheral device from physical impacts when the computer apparatus other than the HDD 31 is in motion.

The present invention has been explained in some detail by describing one or more exemplary embodiments. However, it is to be understood that the scope of the present invention is not restricted to the range of the above-described embodiments. Those skilled in the relevant arts will readily recognize that various changes or modifications may be made to the described embodiments without departing from the scope and spirit of the present invention.

What is claimed is:

1. A computer apparatus comprising:
an accelerometer;
a field-effect transistor switch connected to the accelerometer, wherein the accelerometer receives power via the field-effect transistor switch;
a controller connected to the accelerometer via a set of amplifiers comprising a first amplifier and a second amplifier;
an input/output bridge connected to the controller;
the first amplifier connected to the accelerometer and the controller;
the second amplifier connected to the accelerometer and the controller;
wherein the first amplifier receives output from the accelerometer indicating motion in a first orthogonal, bi-axial direction, amplifies the output, and transmits the amplified out put to the controller;
wherein the second amplifier receives output from the accelerometer indicating motion in a second orthogonal, bi-axial direction, amplifies the output, and transmits the amplified out put to the controller;
wherein the controller determines the physical conditions under which the computer apparatus is operating based on input received from the accelerometer, via the set of amplifiers;
wherein the input/output bridge switches between a plurality of operating modes of the computer apparatus in response to receiving a signal from the controller, each operating mode of the plurality of operating modes corresponding to a different level of power consumption; and
wherein the controller prevents the input/output bridge from switching said system operating mode if the controller determines that said computer apparatus is in motion.

2. A computer apparatus comprising:
an accelerometer;
a field-effect transistor switch connected to the accelerometer, wherein the accelerometer receives power via the field-effect transistor switch;
a controller connected to the accelerometer via a set of amplifiers comprising a first amplifier, a second amplifier, and a third amplifier;
an input/output bridge connected to the controller;
the first amplifier connected to the accelerometer and the controller;
the second amplifier connected to the accelerometer and the controller;
the third amplifier connected to the accelerometer and the controller;
wherein the set of amplifiers comprises;
wherein the first amplifier receives output from the accelerometer indicating motion in a first orthogonal, tri-axial direction, amplifies the output, and transmits the amplified out put to the controller;
wherein the second amplifier receives output from the accelerometer indicating motion in a second orthogonal, tri-axial direction, amplifies the output, and transmits the amplified out put to the controller;
wherein the third amplifier receives output from the accelerometer indicating motion in a third orthogonal, tri-axial direction, amplifies the output, and transmits the amplified out put to the controller;
wherein the controller determines the physical conditions under which the computer apparatus is operating based on input received from the accelerometer, via the set of amplifiers;
wherein the input/output bridge switches between a plurality of operating modes of the computer apparatus in response to receiving a signal from the controller, each operating mode of the plurality of operating modes corresponding to a different level of power consumption; and
wherein the controller prevents the input/output bridge from switching said system operating mode if the controller determines that said computer apparatus is in motion.

3. A computer apparatus comprising:
an accelerometer;
a field-effect transistor switch connected to the accelerometer, wherein the accelerometer receives power via the field-effect transistor switch;
a controller connected to the accelerometer via a plurality of amplifiers;
an input/output bridge connected to the controller;
the plurality of amplifiers connected to the accelerometer and the controller;
wherein each amplifier of the plurality of amplifiers receives output from the accelerometer indicating motion in a different direction, amplifies the output, and transmits the amplified out put to the controller;
wherein the controller determines the physical conditions under which the computer apparatus is operating based on input received from the accelerometer, via the plurality of amplifiers;
wherein the input/output bridge switches between a plurality of operating modes of the computer apparatus in response to receiving a signal from the controller, each operating mode of the plurality of operating modes corresponding to a different level of power consumption; and
wherein the controller prevents the input/output bridge from switching said system operating mode if the controller determines that said computer apparatus is in motion.

* * * * *